United States Patent [19]
Riggs

[11] 3,803,746
[45] Apr. 16, 1974

[54] FISHING LURE

[76] Inventor: Royal W. Riggs, 2406 Albert Lee, Sedalia, Mo. 65301

[22] Filed: Oct. 10, 1972

[21] Appl. No.: 295,935

[52] U.S. Cl. .............................................. 43/35
[51] Int. Cl. ......................................... A01k 83/00
[58] Field of Search ............ 43/35, 36, 37, 41, 42.1, 43/42.43, 43.2

[56] References Cited
UNITED STATES PATENTS

| | | | |
|---|---|---|---|
| 1,697,120 | 1/1929 | Johns | 43/35 |
| 3,646,699 | 3/1972 | Zeman | 43/35 |
| 2,748,520 | 6/1956 | Anderson | 43/35 |
| 2,730,831 | 1/1956 | Williams | 43/36 |
| 1,385,536 | 7/1921 | Gleason | 43/35 |
| 456,776 | 7/1891 | Prior | 43/36 |

Primary Examiner—G. E. McNeill
Attorney, Agent, or Firm—John A. Hamilton

[57] ABSTRACT

A fishing lure consisting of a soft lure body adapted to be attached to a fishing line, a pair of fishhooks spring-urged from a closely adjacent retracted position in which their points are shielded against the lure body so that they cannot catch on weeds, to a more distant extended position spaced apart from the lure body to assist in setting them in a fish's mouth, a latch holding the hooks in their retracted position, and a latch release operable by variable tension on the line to release the latch.

6 Claims, 5 Drawing Figures

PATENTED APR 16 1974 3,803,746

FISHING LURE

This invention relates to new and useful improvements in fishing lures, and has particular reference to lures of the type including a plurality of fishhooks normally grouped closely together as they enter the mouth of a fish, but are then released to move resiliently away from each other, whereby they are efficiently set in the fish's mouth.

The principal object of the present invention is the provision of a fishing lure of the character described wherein the hooks are spring-urged from their closely grouped or retracted position to their widely separated or extended position, being releasably secured in their retracted position by a latch, the latch being releasable by tension of the fishing line caused by the pull of a fish on the line when it takes the lure. The line tension required release the latch may be adjusted to the size of the fish being sought.

Another object is the provision of a fishing lure of the character described having a soft lure body member, the hooks when in their retracted position having their points pressed and shielded against said lure body, whereby they are shielded against being snagged or fouled in underwater plants and weeds, but being movable away from the body member when the hooks are extended.

Other objects are simplicity and economy of construction, and efficiency and dependability of operation.

Figure 1:
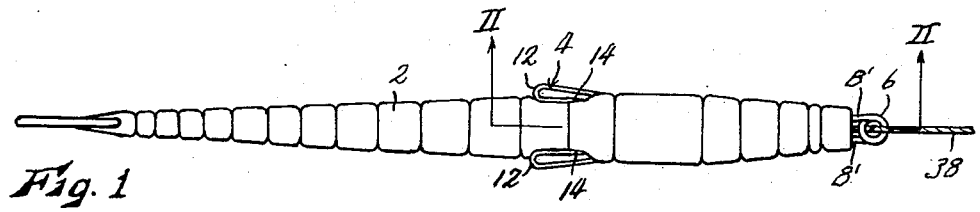
Figure 2:
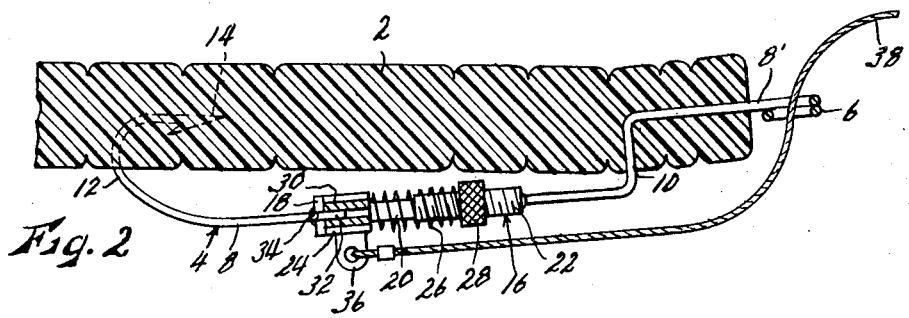
Figure 3:
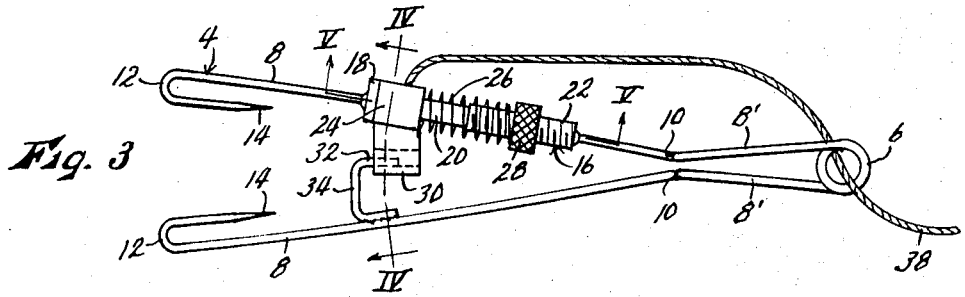
Figure 4:
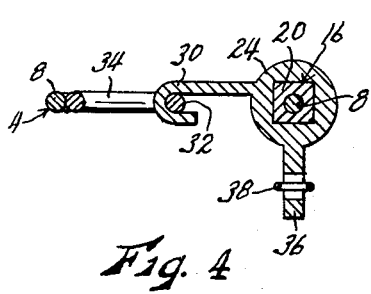
Figure 5:
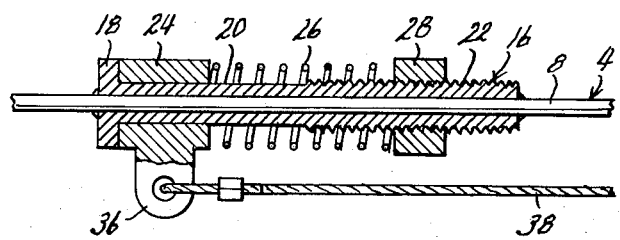

With these objects in view, as well as other objects which will appear in the course of the specification, reference will be had to the accompanying drawing, wherein:

FIG. 1 is a plan view of a fishing lure embodying the present invention, showing the hooks in their latched, retracted position, FIG. 2 is an enlarged fragmentary sectional view taken on line II—II of FIG. 1, FIG. 3 is a top plan view of the lure with the lure body omitted, showing the hooks latched in solid lines and released in dotted lines, FIG. 4 is an enlarged sectional view taken on line IV—IV of FIG. 3, and FIG. 5 is an enlarged, fragmentary sectional view taken on line V—V of FIG. 3.

Like reference numerals apply to similar parts throughout the several views, and the numeral 2 applies to the lure body, which constitutes a slender, elongated length of a very soft, flexible plastic material, often called a "worm" which is configurated to resemble a natural prey of the fish. It may also be transparent or tinted, to further enhance its resemblance to a natural bait, and is often so soft as to be almost jelly-like in consistency. The fishhook member of the lure, designated generally by the numeral 4, constitutes a length of spring steel wire looped at its midpoint to form a closed eye 6, and the end portions of the wire form resilient arms 8 arranged generally in V-form. The portions 8' of arms 8 adjacent eye 6 are arranged relatively parallel and close together, while the remainder of arms 8 are normally widely divergent, as indicated in dotted lines in FIG. 3. At the outer ends of arm portions 8', the arms are offset laterally to the plane of the V-form of the hook member, as indicated at 10. The extreme free end portions of arms 8 are each rebent toward eye 6 to form a bight portion 12, terminating in a barbed point 14 directed toward eye 6. Hook member 4 is mounted in body member 2, by inserting eye 6 into the body member just behind the nose end thereof, then working it forwardly until eye 6 is exposed at the nose end of the body member. The soft consistency of the body material permits this method of attachment. Portions 8' of arms 8 will then lie within the lure body, as shown in FIG. 2, while the remaining major portions of said arms will be disposed externally of and generally parallel to the lure body. The resilience of said arms is such that the bights 12 and points 14 of the hooks normally will be spaced outwardly at the respectively opposite sides of the body, this being termed the "extended" position of the hooks and being indicated in dotted lines in FIG. 3. However, by resiliently flexing arms 8, the hook points 14 as well as portions of the bights 12 may be pressed into resiliently indenting relationship to the respectively opposite sides of the lure body, as indicated in FIGS. 1 and 2, and in solid lines in FIG. 3, this being termed the "retracted" position of the hooks. The engagement of portions of hook arms 8 in the material of the body member does not appreciably interfere with the movement of the hooks between their extended and retracted positions.

The hooks may be releasably secured in their retracted position, and released for movement to their extended position, by a latch mechanism as shown, this mechanism including a tubular sleeve 16 fitted over one of the arms 8, which of course constitute the shank portions of the fishhooks, and rigidly affixed thereto by welding or otherwise. Externally, said sleeve presents a flange 18 at the end thereof closest to the point of the associated fishhook, then a reduced shank 20 of square cross-sectional contour, and finally a cylindrical threaded portion 22. A slide 24 is disposed slidably but non-rotatably on shank 20, and is normally biased against flange 18 by a helical compression spring 26 surrounding the sleeve, said spring bearing at one end against the slide and at its opposite end against an adjusting nut 28 engaged on the threaded portion 22 of the sleeve.

Affixed to and projecting laterally from slide 24 toward the other of arms 8 is a hook member 30 which opens toward slide 24, and is adapted to engage the terminal leg 32 of a wire keeper 34 welded at its opposite end to said other arm 8, whereby to secure the fishhooks in their retracted position, as shown in solid lines in FIG. 3. Keeper leg 32 projects toward eye 6, so that hook 30 may be disengaged therefrom by movement of slide 24 along shank 20 against the pressure of spring 26, thereby releasing the fishhooks to spring to their extended position as indicated in dotted lines in FIG. 3. Also affixed to slide 24 is a perforated ear 36. The lure is attached to a fishing line 38 by threading said line loosely through eye 6, then tying said line in ear 36, as shown.

In use, the lure is set by manually pressing the two hooks close together in their retracted position and secured by the engagement of hook 30 and keeper 34, as shown in FIGS. 1 and 2, and in solid lines in FIG. 3. At this time, care is taken to so position the flexible body member 2 that the points 14 and portions of the bights 12 of the fishhooks are pressed firmly into indenting relationship with the respectively opposite sides of the lure body, as best shown in FIG. 1. This engagement is sufficiently firm to hold the lure body securely in place between the fishhook points, this relationship being obtainable either by selecting a body member 2 having the required transverse thickness, or by bending the bight end portions of the fishhooks to accommodate them to lure bodies having different transverse thicknesses. Thus, during the fishing process, and before a fish takes the lure, the points 14 of the fishhooks are efficiently shielded by the lure body, so that they cannot snag or become fouled in underwater weeds or the like. This "weed guard" action is an important feature of the present invention. At this time, hook 30 is prevented from disengaging keeper 34 by the pressure of spring 26 against slide 24. However, when a fish takes the lure and bites thereon, this exerts a tension on the fishing line 38, and this tension acts on ear 36 of slide 24 to pull said slide along shank 20 against the pressure of spring 26, thereby disengaging hook 30 from keeper 34 and releasing the fishhooks for resilient expansion to their extended positions as shown in dotted lines in FIG. 3. This expansion moves the fishhooks points 14 away from the lure body, so that they are exposed for engagement in the fish's mouth, and since the expansion of the hooks occurs within the mouth of the fish, it also greatly assists in the "automatic" setting of the hooks in the flesh of the fish. Also, the lure may be triggered by the fisherman himself, by a sudden jerk or twitch on the line. This would ordinarily be done when the fisherman feels the first indication of an active tug on the line.

The inclusion of line 38 in a running engagement through eye 6 provides that the line will always exert force on slide 24 in the proper direction to move said slide against spring 26. The degree of line tension required to release latch hook 30 from keeper 34 may be adjusted, so that the lure will not be triggered when taken by fish smaller than those for which it is set, by turning nut 28 to move it along the threaded portion 22 of sleeve 16, thereby varying the tension of spring 26.

While I have shown and described a specific embodiment of my invention, it will be readily apparent that many minor changes of structure and operation could be made without departing from the spirit of the invention.

What I claim as new and desire to protect by Letters Patent is:

1. A fishing lure adapted to be attached to the end of a fishing line, and comprising:
  a. a lure body member formed of soft flexible material,
  b. a pair of fish hooks comprising the arm portions of a length of spring wire bent intermediate its ends into a V-formation, the apex portion of said V-formation being secured in said body member and the arm portions being free of said body member, the free ends of said arm portions being rebent toward said apex to form fishhook bights and points, and said body member being elongated and extending between the point portions of the hooks, said fish hooks being movable by flexure of said arm portions between a retracted position where their points are pressed laterally into indenting relation to said body member, and an extended position wherein their points are relatively widely spaced apart from each other, and are spaced apart from said lure body,
  c. resilient means biasing said fishhooks to said extended position,
  d. latch means operable when engaged to secure said fishhooks in said retracted position, and
  l. release means operable responsively to tension on said fishing line to disengage said latch means.

2. A fishing lure as recited in claim 1 wherein said latch and release means comprise:
  a. a hook carried by one of said arms,
  b. a keeper carried by the other of said arms and engageable by said hook to secure said fishhooks in their retracted position, and
  c. release means operable to disengage said hook from said keeper.

3. A fishing lure as recited in claim 2 wherein said hook is movable along its associated arm away from the apex of said V-formation, whereby to be positioned to engage said keeper, and toward said apex whereby to be disengaged from said keeper, and wherein said fishing line has a running engagement with said V-formation at the apex thereof, and is secured to said hook, whereby tension on said fishing line will disengage said hook from said keeper.

4. A fishing lure as recited in claim 3 wherein said spring wire is bent to form a closed eye at the apex of the V-formation thereof, said fishing line being trained loosely through said eye.

5. A fishing lure as recited in claim 3 with the addition of a spring carried by the arm associated with said hook, and biasing said hook yieldably toward the position in which it engages said keeper, whereby a fishing line tension of a pre-determined degree is required to disengage said hook from said keeper.

6. A fishing lure as recited in claim 4 with the addition of means operable to adjust the tension of said biasing spring, whereby the line tension required to release the hook from the keeper may be adjustably varied.

* * * * *